United States Patent
Warrum (10) Patent No.: US 10,656,985 B2
(45) Date of Patent: May 19, 2020

(54) HEARTBEAT FAILURE DETECTION

(71) Applicant: International Business Machines Corporation, Armonk, NY (US)

(72) Inventor: Bradley E. Warrum, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 78 days.

(21) Appl. No.: 15/881,348

(22) Filed: Jan. 26, 2018

(65) Prior Publication Data

US 2019/0235939 A1 Aug. 1, 2019

(51) Int. Cl.
*G06F 11/07* (2006.01)
*G06F 11/20* (2006.01)

(52) U.S. Cl.
CPC .......... *G06F 11/076* (2013.01); *G06F 11/073* (2013.01); *G06F 11/0709* (2013.01); *G06F 11/0757* (2013.01); *G06F 11/2005* (2013.01); *G06F 2201/81* (2013.01); *G06F 2201/85* (2013.01)

(58) Field of Classification Search
CPC .. G06F 11/00; G06F 11/0757; G06F 11/1438; G06F 11/2033; G06F 11/3055; H04L 43/0811; H04L 43/10
See application file for complete search history.

(56) References Cited

U.S. PATENT DOCUMENTS

| | | | | |
|---|---|---|---|---|
| 8,204,990 | B1* | 6/2012 | Avery | H04L 12/4625 307/112 |
| 9,240,906 | B2 | 1/2016 | Edwards et al. | |
| 2012/0278801 | A1* | 11/2012 | Nelson | G06F 9/45533 718/1 |
| 2015/0019901 | A1 | 1/2015 | Griffith et al. | |
| 2015/0317212 | A1* | 11/2015 | Lee | G06F 11/2038 707/685 |
| 2016/0117213 | A1* | 4/2016 | Arjun | G06F 11/0757 714/55 |
| 2016/0241561 | A1* | 8/2016 | Bubany | H04L 63/102 |

FOREIGN PATENT DOCUMENTS

| | | |
|---|---|---|
| CN | 102185740 A | 9/2011 |
| WO | 20150184921 A1 | 12/2015 |

OTHER PUBLICATIONS

Wikipedia, "Sliding window protocol", printed Jan. 24, 2018.
(Continued)

*Primary Examiner* — Jigar P Patel
(74) *Attorney, Agent, or Firm* — Martin & Associates, LLC; Bret J. Petersen (57) ABSTRACT

A heartbeat monitor detects a heartbeat failure by accumulating overage time beyond an expected time interval for each heartbeat in a sliding window of time for a connection. The connection is considered unreliable when the total overage time exceeds a threshold. The total overage time is determined by accumulating all overage time beyond the expected interval over a sliding window of time. In an illustrated example, the heartbeat monitor resides in a hypervisor to track a heartbeat of a network link to provide failover capability to a backup when the network link is no longer reliable.

19 Claims, 5 Drawing Sheets

(56) References Cited

OTHER PUBLICATIONS

Debrunner, Dan, "SPL Sliding Windows Explained", Aug. 22, 2014, updated Jan. 2, 2018.
Turchetti et al., "A QoS-configurable failure detection service for internet applications", Journal of Internet Services and Applications, 2016.
IBM Knowledge Center, "IBM InfoSphere Streams Version 3.2.1—Aggregate", printed Jan. 24, 2018.
English translation of WO2015/0184921 A1, published Dec. 10, 2015.
English translation of CN102185740 A, published Sep. 14, 2011.

* cited by examiner

FIG. 7 ial_field
HEARTBEAT FAILURE DETECTION

BACKGROUND

1. Technical Field

This disclosure generally relates to computer communication, and more specifically relates to a system and method for heartbeat failure detection by accumulating overage time beyond an expected time interval for each heartbeat in a sliding window of time.

2. Background Art

In high availability networking environments, redundant failover technology is commonly used to provide network connectivity with increased uptime and reliability. Some systems increase uptime of a network connection by directing network traffic through one of many potential network links. When an active network link becomes unreliable or unresponsive, the system switches to a backup link until the primary link becomes available again. Some failover systems employ a heartbeat mechanism within bridging logic of a network link that intermittently notifies the system that the bridge is still functioning as expected. If the system determines that the active link's heartbeat is missing or in some way unreliable, then the failover system can use this information to provoke a failover to another network link.

Prior art systems typically employ a heartbeat mechanism with configurable "delay" and "threshold" settings that allow the user to control how often heartbeats are sent, and the number of consecutively missed heartbeats that the system will tolerate before a failure is determined. These systems do not detect a network link that is operating marginally within the threshold where it may be continuously missing a number of consecutive heartbeats just under the threshold value.

BRIEF SUMMARY

A system and method for detecting a heartbeat failure using a sliding window for error accumulation. A heartbeat monitor adds overage time beyond an expected time interval for each heartbeat for a total overage time. The connection is considered unreliable when the total overage time exceeds a threshold. The total overage time is determined by accumulating all overage time beyond the expected interval over a sliding window of time. In an illustrated example, the heartbeat monitor resides in a hypervisor to track a heartbeat of a network link to provide failover capability to a backup when the network link is no longer reliable.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein relate to a system and method for detecting a heartbeat failure using a sliding window for error accumulation. A heartbeat monitor adds overage time beyond an expected time interval for each heartbeat for a total overage time. The connection is considered unreliable when the total overage time exceeds a threshold. The total overage time is determined in a sliding window of time by removing overage times no longer contained in the window. In an illustrated example, the heartbeat monitor resides in a hypervisor to track a heartbeat of a network link to provide failover capability to a backup when the network link is no longer reliable.

Figure 1:
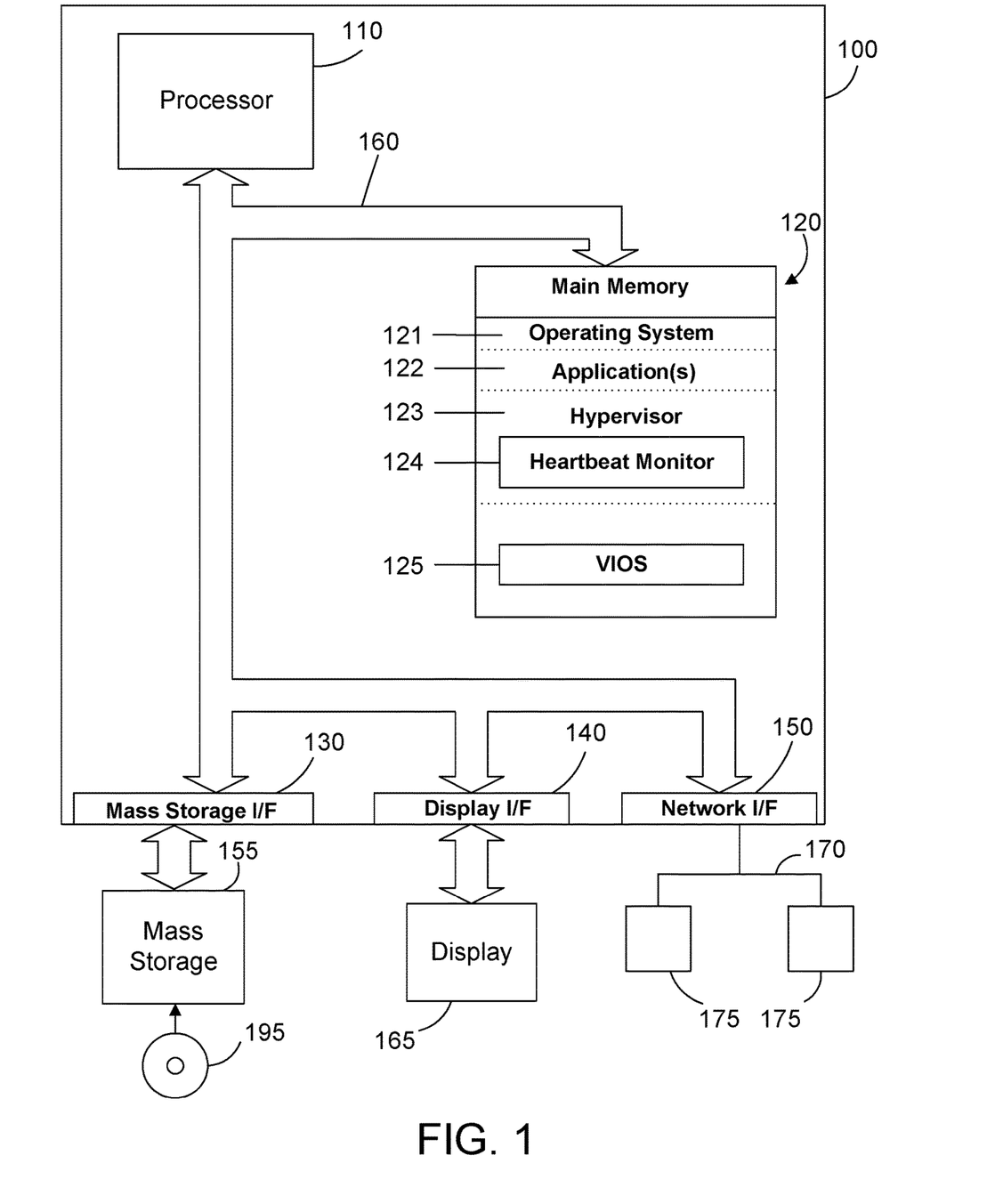
FIG. 1 is a block diagram a computer system with a heartbeat monitor for detecting a heartbeat failure by accumulating overage time beyond an expected time interval for each heartbeat in a sliding window of time.

Referring to FIG. 1, a computer system 100 is one suitable implementation of a computer system that is capable of performing the computer operations described herein including detecting a heartbeat using a sliding window for error accumulation as described herein. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes one or more applications 122. The memory 120 also includes a hypervisor 123 that includes a heartbeat monitor 124, and one or more virtual input/output servers (VIOSs).

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, applications 122, hypervisor 123, heartbeat monitor 124, and VIOSs 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and the hypervisor 123 and later executes the program instructions that make up the applications 122 as directed by a user.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
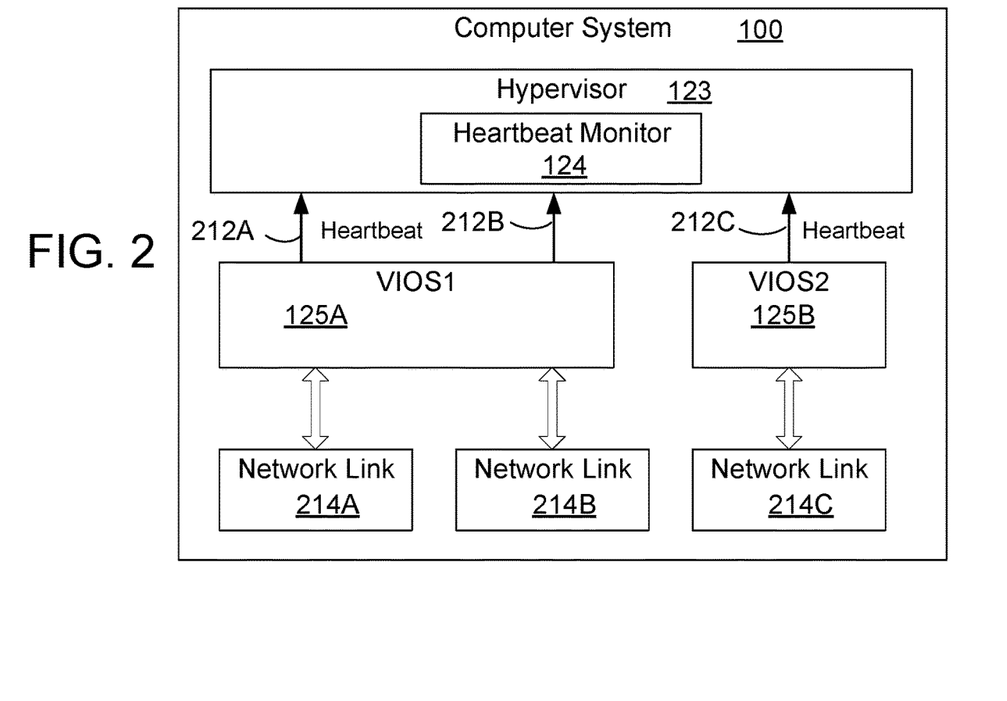
FIG. 2 illustrates a simplified block diagram of a system with a heartbeat monitor in a hypervisor for detecting a heartbeat of a network link using a sliding window for overage time accumulation.

FIG. 2 illustrates additional details of a simplified example of a computer system 100 described above with reference to FIG. 1. The computer system 100 includes a hypervisor 123. The hypervisor 123 is one suitable example of partition manager system software that allocates and controls virtual resources on the system 100. The hypervisor 123 runs on the computer system 100 and provides a virtual operating platform for virtual machines or logical partitions as known in the prior art. The hypervisor 123 also virtualizes the system hardware to provide virtualized hardware resources to the partitions. The system hardware that is virtualized may include memory, computer processing units and I/O devices as known in the prior art. The computer system 100 may include one or more virtual input output servers (VIOSs). In the illustrated example, the computer system 100 includes VIOS1 125A and VIOS2 125B (collectively referred to as VIOSs 125) managed by the hypervisor 123. In the illustrated example of FIG. 2, the system 100 further includes three network links 214A, 214B and 214C (collectively network links 214). The network links 214 represent the hardware portion of one or more network communication adapters that are allocated to the corresponding VIOS 125. The hypervisor may allocate a VIOS 125 with a corresponding network link to an application 122 (FIG.1). The application 122 may be operating within a logical partition (LPAR) and the hypervisor providing access to the VIOS through a virtual network client in the manner known in the prior art.

Again referring to FIG. 2, the hypervisor of computer system 100 includes a heartbeat monitor 124 that detects a heartbeat 212 provided by the VIOSs 125. In the illustrated example, the heartbeat monitor monitors heartbeats through the VIOSs. In other examples, a heartbeat monitor could monitor the physical network links directly. The heartbeat monitor 124 supports high availability for the system by providing redundant failover for network communication. The heartbeat monitor 124 detects when the network link 214 or the VIOS 125 becomes unreliable or unresponsive. The hypervisor can then switch to a backup network link. The heartbeat 212 is similar to known heartbeats where the heartbeat 212 intermittently notifies the system that the communication link including the VIOS and the network link is still functioning as expected. If the heartbeat monitor determines that the active link's heartbeat is in some way unreliable, then the system can use this information to provoke a failover to another network link. In the illustrated example, the heartbeat monitor accumulates overage time of a heartbeat using a sliding window to allow the detection of an unreliable connection. The heartbeat monitor adds overage time beyond an expected time interval for each heartbeat to accumulate a total overage time. The connection is considered unreliable when the total overage time exceeds a threshold. The total overage time is determined by accumulating all overage time beyond the expected interval over a sliding window of time. Overage times are removed from the total overage time when they are no longer contained within the window. Operation of the heartbeat monitor is described further below.

The VIOS 125 shown in FIG. 2 is configured to send a heartbeat message repeatedly at consistent intervals for each attached network link 214 to the heartbeat monitor 124 in the hypervisor 123. The VIOS sends the respective heartbeat 212 to the heartbeat monitor 124 to indicate the respective network link is functioning properly and fully operational. The interval of time between heartbeat messages is referred to as the expected heartbeat interval. If a heartbeat has not arrived after the expected heartbeat interval has elapsed, any additional time spent waiting for the heartbeat message is considered overage time. For example, the system may be configured to send heartbeats every second. If one heartbeat arrives on the receiver three seconds after the last heartbeat was received, then the system accounts for two seconds of overage time for the current heartbeat. The heartbeat monitor 124 accumulates a total overage time for all heartbeats from a heartbeat source that occur over a fixed interval of time. In the examples below, the interval of time is referred to as the sliding window interval.

Figure 3:
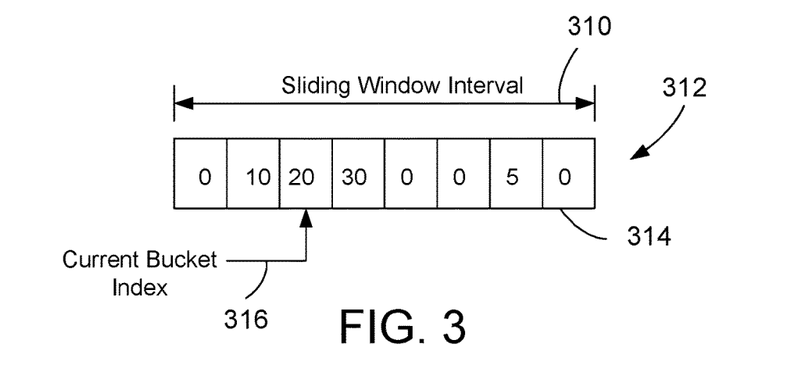
FIG. 3 illustrates an example of a sliding window for detecting a heartbeat failure by accumulating overage time of the heartbeats over the sliding interval of time.
Figure 6:
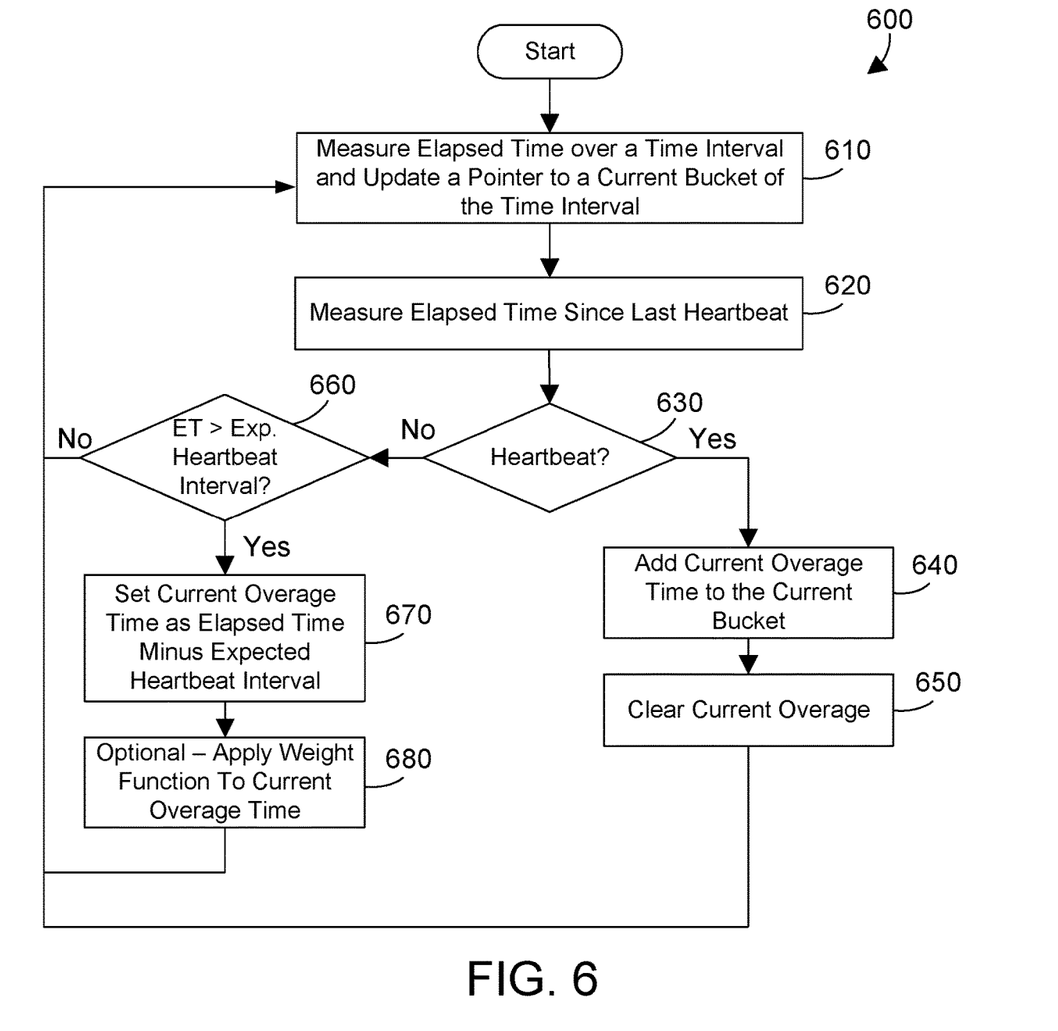
FIG. 6 is a flow diagram of a specific method for step 530 in FIG. 5.

FIG. 3 illustrates an example of implementing a sliding window interval 310 to accumulate the total overage time. In this example, the sliding window interval 310 is represented as a circular buffer 312. The purpose of the sliding window interval 310 is to define a point at which older overage time infractions can be removed from the accumulated total overage time. This pruning of older overage times can be accomplished by dividing the sliding window interval into numerous non-overlapping, contiguous sub-intervals of the sliding window referred to herein as buckets 314. The total overage time for each window bucket 314 is then accumulated and stored in the bucket of the circular buffer 312. In the example of FIG. 3, the buckets contain overage times represented as seconds. So in this example, the circular buffer 312 contains overage times 0, 10, 20, 30, 0, 0, 5 0. So the total overage time for all heartbeat within the sliding window interval 310 for this example is 65 seconds. The heartbeat monitor can add the contents of each bucket in the circular buffer 312 to get the total overage time and compare it to the reliability threshold. A current overage time may also need to be added to get the total overage time as shown in FIG. 6 and described below. A pointer or current bucket index 316 of the circular buffer 312 is incremented to rollover to the next bucket each time a full sub-interval of sliding window time, i.e. the bucket time period elapses. Each time the current bucket index 316 is incremented to the next bucket, any overage time in the oldest bucket now pointed to by the index is removed from the total overage time as described below.

Figure 4:
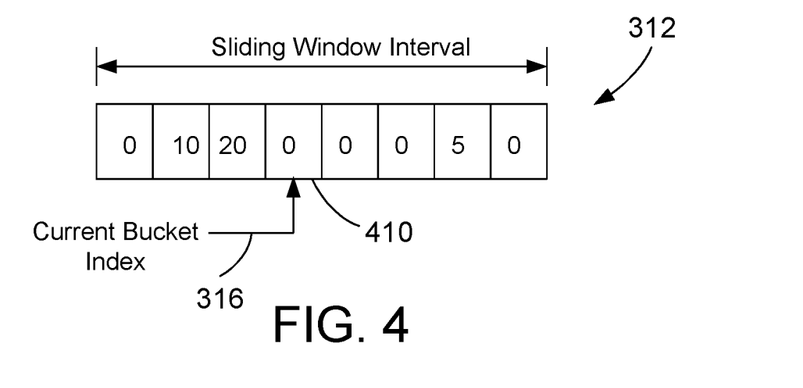
FIG. 4 illustrates the sliding window of FIG. 3 with an incremented index.

FIG. 4 illustrates the sliding window of FIG. 3 after incrementing the current bucket index 316 to point to the next bucket 410 which is the fourth bucket in the circular buffer 312. As shown in FIG. 3, the next bucket 410 previously held a value of 30 seconds. When the current bucket index is incremented to point to the next bucket 410, the total overage time in the next bucket 410 is cleared or reset to zero. This prunes the older overage times in the sliding window as the current bucket index proceeds in a circular pattern over the circular buffer 312. In the illustrated example, at the beginning of the next bucket interval of time, the circular buffer 312 contains overage times 0, 10, 20, 0, 0, 0, 5 0 for a total of 35 seconds over the sliding window interval 310.

As introduced above, a threshold may be compared with the total overage time to indicate a heartbeat failure. For example, a heartbeat failure may indicate that the heartbeat provider and by extension the network link is not functioning or unreliable. A user may be allowed to configure the threshold that is referred to herein as the reliability threshold. In the illustrated example, the reliability threshold is the maximum amount of total overage time that may accumulate in the system within the sliding window interval 310 before the failover logic in the heartbeat monitor considers the connection unreliable. When a failover is triggered, the system may benefit from knowing which backup connection is the most reliable. To do this, the system may maintain a metric for each heartbeat connection called an overage ratio. The overage ratio is defined as the total overage time divided by the sliding window interval. The failover logic can utilize this ratio when comparing backup device reliability in failover scenarios where more reliable devices will have a ratio value that tends towards zero, indicating that a smaller fraction of the sliding window interval was consumed by heartbeat overage time.

The example described above treats all overage time for each expected heartbeat identically. For instance, a scenario where the expected heartbeat interval is missed by one second ten times is equivalent to a scenario where a single expected heartbeat interval is missed by ten seconds. Thus, a connection may be considered unreliable due to a single larger failure, or due to the accumulation of many minor failures. However, in some environments, it may be desirable to treat larger single failures as higher severity than many minor failures. To accomplish this, the system may include a weighting function to progressively overweight a measured overage time by adding additional overage time based on the amount of overage time accumulated for the currently expected heartbeat. For example, if an overage time of 5 is weighted to 7 and an overage time of 10 is weighted to 15. The weighted overage time can then be added to each bucket in the circular buffer as described above. When all the overage times in the buckets are added to get the total overage time, the reliability threshold may exceeded by a few large overage times, whereas the reliability threshold would not have been exceeded if the same total overage time was divided among many small overage times.

Figure 5:
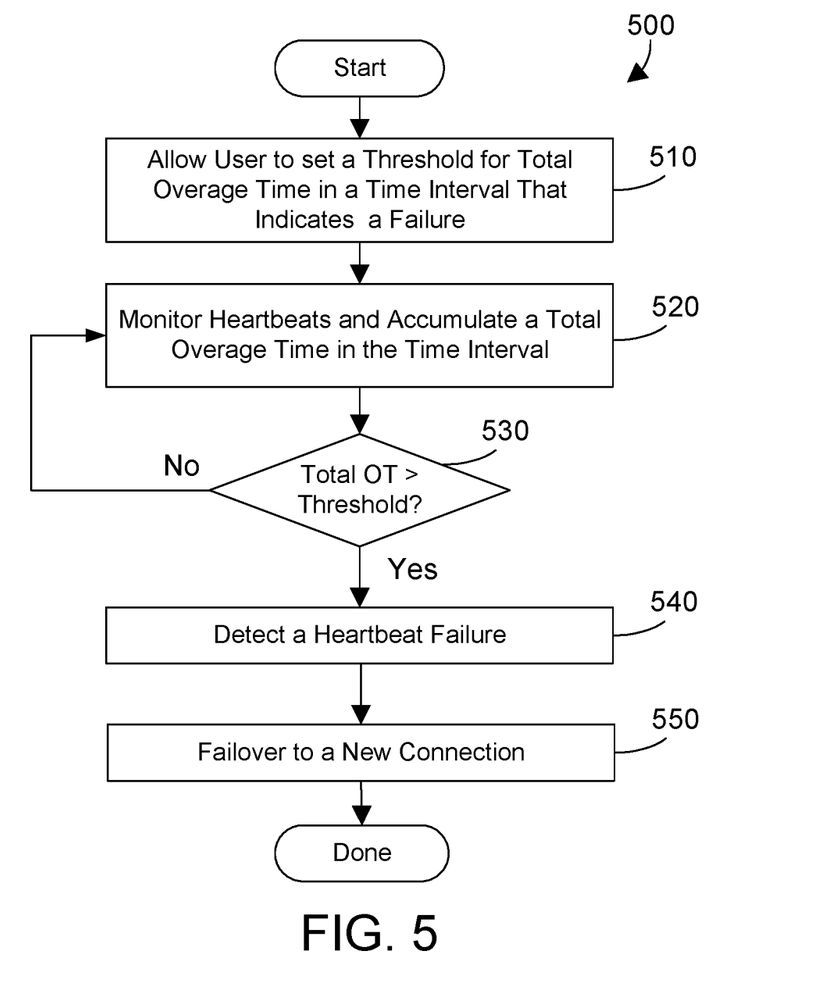
FIG. 5 is a flow diagram of a method for a heartbeat monitor detecting a heartbeat failure using a sliding window for error accumulation.

Referring to FIG. 5, a method 500 shows one suitable example for detecting a heartbeat failure using a sliding window for error accumulation. Portions of method 500 are preferably performed by the heart beat monitor 124 and the VIOS 125 shown in FIG. 1. First, allow a user to set a threshold for a total overage time that indicates a failure when the threshold is exceeded within a time interval (step 510). Next, monitor heartbeats and accumulate overage time in the time interval (step 520). If the total overage time is less than the threshold (step 530=no) then return to step 520. If the total overage time is greater than the threshold (step 530=yes) then detect a heartbeat failure (step 540). Failover to a new connection (step 550). The method is then done.

FIG. 6 shows one suitable example of a method 600 to monitor heartbeats and accumulate overage times. Method 600 thus shows a suitable method for performing step 520 in method 500 in FIG. 5. First, measure the elapsed time over a time interval and update a pointer to a current bucket of the time interval (step 610). Measure an elapsed time since the last heart beat (step 620). If there is a heartbeat (step 630=yes) then add the current overage time to the current bucket (step 640), then clear the current overage time (step 660) and then return to step 610. If there is no heartbeat (step 630=no) then check if the elapsed time is greater than the heartbeat interval (step 660). If the elapsed time is not greater than the heartbeat (step 660=no) then return to step 610. If the elapsed time is greater than the heartbeat (step 660=yes) then set the current overage time as the elapsed time minus the expected heartbeat interval (step 670). Optionally apply a weight function to the current overage time (step 670). Return to step 610 to continue the method 600 in a continuous loop.

Figure 7:
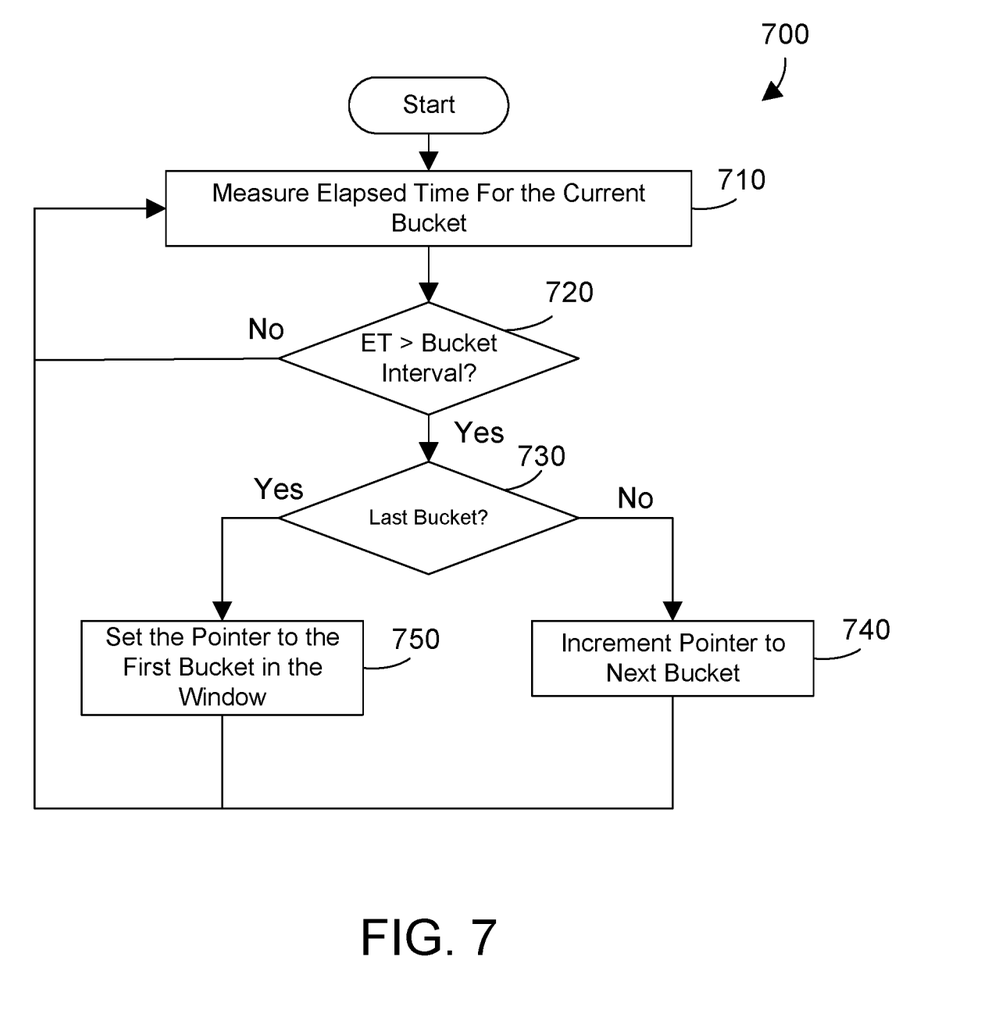
FIG. 7 is a flow diagram of a specific method for step 610 in FIG. 6.

FIG. 7 shows one suitable example of a method 700 to measure the elapsed time over a time interval and track a pointer to a current bucket of the time interval. Method 700 thus shows a suitable method for performing step 610 in method 600 in FIG. 6. First, measure the elapsed time for the current bucket (step 710). Determine if the elapsed time is greater than the bucket interval (step 720). If the elapsed time is not greater than the bucket interval (step 720=no) then return to step 720. If the elapsed time is greater than the bucket interval (step 720=yes) then check if the current bucket is the last bucket (step 730). If the current bucket is not the last bucket (step 670=no) then increment the pointer to the next bucket (step 740) and return to step 710. If the current bucket is the last bucket (step 670=yes) then set the pointer to the first bucket in the sliding window (step 750) and return to step to step 710 to continue the method 700 in a continuous loop.

The disclosure and claims herein relate to a system and method for detecting a heartbeat failure using a sliding window for error accumulation. In an illustrated example, a heartbeat monitor adds overage time beyond an expected time interval for each heartbeat for a total overage time. Using a total overage time accumulated over a time interval allows detection of a heartbeat failure where the heartbeat is inconsistent or unreliable. In contrast, to prior art methods would not detect a failure where the heartbeat is operating marginally within a prior art threshold but continuously missing a number of consecutive heartbeats just under the prior art threshold value.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a heartbeat monitor in the memory and executed by the at least one processor monitoring heartbeats from one or more resources wherein the heartbeat monitor determines an overage time for each received heartbeat as a time beyond an expected interval for each heartbeat;
   wherein the heartbeat monitor accumulates a total overage time for a plurality of heartbeats from a resource over a time interval and determines a heartbeat failure when the total overage time for the plurality of heartbeats exceeds a threshold; and
   wherein the heartbeat monitor progressively treats larger single failures as higher severity by overweighting a measured overage time by adding additional overage time based on the amount of overage time accumulated for a currently expected heartbeat.

2. The apparatus of claim 1 wherein the one or more resources comprises a virtual input/output server (VIOS).

3. The apparatus of claim 2 wherein the VIOS monitors a network link and passes the heartbeats to the heartbeat monitor to indicate the network link is functioning properly.

4. The apparatus of claim 1 wherein the heartbeat monitor uses a circular buffer accumulate the total overage times for a number of heartbeats in a plurality of buckets in the circular buffer.

5. The apparatus of claim 4 wherein the heartbeat monitor uses a current bucket index to point to a bucket in the circular buffer to accumulate overage times for each sub-interval of the time interval.

6. The apparatus of claim 5 wherein the heartbeat monitor moves the index to a new current bucket and clears contents of the new current bucket prior to accumulating overage times in the new current bucket.

7. The apparatus of claim 1 wherein an overage time is an elapsed time of a heartbeat since a last heartbeat that is greater than the expected heartbeat interval and the total overage time is an accumulation of overage times for all heartbeats in the time interval.

8. The apparatus of claim 1 wherein the threshold is set by a user.

9. A computer-implemented method executed by at least one processor for detecting a heartbeat failure comprising:
   monitoring heartbeats from a resource and determining an overage time for each received heartbeat as a time beyond an expected interval for each heartbeat;
   accumulating a total overage time for heartbeats from the resource over a time interval;
   progressively treating larger single failures as higher severity by overweighting a measured overage time by adding additional overage time based on the amount of overage time accumulated for a currently expected heartbeat and
   determining a heartbeat failure when the total overage time exceeds a threshold.

10. The method of claim 9 wherein the resource comprises a virtual input/output server (VIOS).

11. The method of claim 10 wherein the VIOS monitors a network link and passes the heartbeats to the heartbeat monitor to indicate the network link is functioning properly.

12. The method of claim 9 further comprising accumulating the total overage time in a circular buffer where a total overage time for a number of heartbeats is accumulated in a plurality of buckets in the circular buffer.

13. The method of claim 12 further comprising using a current bucket index to point to a bucket in the circular buffer to accumulate overage times for each sub-interval of the time interval.

14. The method of claim 13 further comprising moving the index to a new current bucket and clearing a contents of the new current bucket prior to accumulating overage times in the new current bucket.

15. The method of claim 9 wherein an overage time is an elapsed time of a heartbeat since a last heartbeat that is greater than the expected heartbeat interval and the total overage time is an accumulation of overage times for all heartbeats in the time interval.

16. The method of claim 9 further comprising allowing a user to set the threshold for the total overage time.

17. The method of claim 9 further comprising providing a hypervisor that manages a logical partition on a computer server, wherein the hypervisor comprises a heartbeat monitor that monitors heartbeats from one or more network links.

18. The method of claim 9 further comprising failing over to another network link when the heartbeat failure is detected.

19. A computer-implemented method executed by at least one processor for detecting a heartbeat failure comprising:
   providing a hypervisor that manages a logical partition on a computer server, wherein the hypervisor comprises a heartbeat monitor that receives heartbeats from a VIOS that indicate a first network link is functioning properly;
   allowing a user to set a threshold for a total overage time;
   monitoring heartbeats from the VIOS and determining an overage time for each received heartbeat as a time beyond an expected interval for each heartbeat;
   accumulating the total overage time for heartbeats from the VIOS over a time interval in a circular buffer where a total overage time for a number of heartbeats is accumulated in a plurality of buckets in the circular buffer using a current bucket index to point to a bucket in the circular buffer to accumulate overage times for each sub-interval of the time interval;
   progressively treating larger single failures as higher severity by overweighting a measured overage time by adding additional overage time based on the amount of overage time accumulated for a currently expected heartbeat
   determining a heartbeat failure when the total overage time exceeds a threshold; and
   failing over to a second network link when the heartbeat failure is detected.

* * * * *